(12) United States Patent
Gondi et al.

(10) Patent No.: US 9,183,101 B2
(45) Date of Patent: Nov. 10, 2015

(54) HIGH AVAILABILITY ACROSS GEOGRAPHICALLY DISJOINT CLUSTERS

(71) Applicant: VMware, Inc., Palo Alto, CA (US)

(72) Inventors: Anjaneya Prasad Gondi, Fremont, CA (US); Hemanth Kalluri, San Jose, CA (US); Naveen Kumar Kalaskar, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 166 days.

(21) Appl. No.: 14/166,461

(22) Filed: Jan. 28, 2014

(65) Prior Publication Data

US 2015/0212910 A1     Jul. 30, 2015

(51) Int. Cl.
*G06F 11/00* (2006.01)
*G06F 11/20* (2006.01)
*G06F 11/14* (2006.01)

(52) U.S. Cl.
CPC ........ *G06F 11/2025* (2013.01); *G06F 11/1438* (2013.01); *G06F 11/2033* (2013.01); *G06F 11/2069* (2013.01)

(58) Field of Classification Search
CPC ............ G06F 11/2025; G06F 11/1438; G06F 11/2033; G06F 11/2069
See application file for complete search history.

(56) References Cited

U.S. PATENT DOCUMENTS

| | | | | |
|---|---|---|---|---|
| 7,165,158 B1 * | 1/2007 | Yagawa | ............... | G06F 11/2069 711/114 |
| 8,396,807 B1 * | 3/2013 | Yemini | ................... | G06Q 10/06 705/400 |
| 2007/0094367 A1 * | 4/2007 | Esfahany | .............. | G06F 9/5077 709/223 |
| 2008/0104443 A1 * | 5/2008 | Akutsu | ............... | G06F 11/2058 714/6.12 |
| 2008/0189468 A1 * | 8/2008 | Schmidt | ................ | G06F 11/203 711/6 |
| 2012/0179771 A1 * | 7/2012 | Ganti | ................... | G06F 11/1425 709/213 |
| 2013/0091335 A1 * | 4/2013 | Mulcahy | ............. | G06F 11/2038 711/163 |
| 2014/0033201 A1 * | 1/2014 | Dawkins | ............. | G06F 11/1484 718/1 |
| 2014/0095826 A1 * | 4/2014 | Rajagopal | ............. | G06F 3/0605 711/170 |

OTHER PUBLICATIONS

Site Recovery Manager Administration Guide, vCenter Site Recovery Manager 4.0, EN-000182-00, VMware, Copyright 2008, 2009 VMware, Inc., 68 pages.
Stretched Clusters and VMware vCenter Site Recovery Manager, Understanding the Options and Goals, Technical White Paper, Copyright 2009 VMware, Inc., 18 pages.
VMware vSphere Metro Storage Cluster Case Study, VMware vSphere 5.0, Technical Marketing Documentation v 1.0 May 2012, Copyright 2012 VMware, Inc., 32 pages.

* cited by examiner

*Primary Examiner* — Yolanda L Wilson (57) ABSTRACT

Exemplary methods, apparatuses, and systems include a first virtual infrastructure management (VIM) server monitoring a first host device to determine if the first host device receives one or more messages within an interval of time from a first storage device indicating a failure of one or more logical disks within the first storage device. The first VIM server manages a first virtual datacenter including the first host device and the first storage device. A second VIM server manages a second virtual datacenter including a second host device and a second storage device. The logical disk is replicated on the second storage device. The first VIM server determines, that a plurality of virtual machines running on the first host device is dependent upon the logical disk(s). The first VIM server performs, in response to the dependency upon the logical disk, a failover of the virtual machines to the second host device.

20 Claims, 5 Drawing Sheets

HIGH AVAILABILITY ACROSS GEOGRAPHICALLY DISJOINT CLUSTERS

FIELD OF THE INVENTION

The various embodiments described herein relate to fault recovery in virtual datacenters. In particular, embodiments relate to the failover of a virtual machine between geographically disjoint clusters of devices in response to the loss of a logical storage device.

BACKGROUND OF THE INVENTION

A primary consideration for the architecture of a virtual datacenter is how to best maximize the availability of the services provided by the virtual machines. Availability solutions are designed to improve the resiliency of local systems or entire sites and fall broadly into the categories of downtime avoidance and fault recovery. Fault recovery solutions include high availability and disaster recovery. High availability (HA) is an automated failover solution, typically within a single datacenter, that responds to unplanned outages and restarts virtual machines as appropriate. For example, if a virtual machine fails on one host device, HA may respond by restarting the virtual machine on another host device. Disaster recovery is a manual process for recovering all or a portion of a datacenter at a recovery site from replicated data. For example, a disaster recovery tool alerts an administrator of a possible site failure. The administrator may then provide input to the disaster recovery tool to initiate recovery of all or a portion of the inventory of virtual machines within the protected datacenter.

Recently, HA has been applied to clusters of devices that span datacenter sites. These "stretched clusters" offer the ability to balance workloads between two datacenters, enabling migration of services between geographically close sites without sustaining an outage. Stretched clusters add benefits to site-level availability and downtime avoidance, but introduce considerable complexity at the network and storage layers, as well as demanding rigorous operational management and change control. A cluster depends upon a single (logical) storage subsystem and single virtualization management server. As a result, the stretched cluster does not provide fault tolerance for the virtualization management server. A stretched cluster expands upon the functionality of a cluster by enabling devices within multiple locations to be a part of a single cluster. For example, disk writes are committed synchronously at both locations to ensure that data is consistent, regardless of the location from which it is being read. The stretched cluster replication model, however, does not support asynchronous replication and requires significant bandwidth and very low latency between the sites involved in the cluster. As a result, stretched cluster sites are kept within a limited geographic range, e.g., within 100 kilometers or 5 microseconds round-trip time latency. Additionally, should a major portion of the virtual environment fail, current implementations of HA are not designed for complex disaster recovery scenarios in which virtual machines start in a particular sequence. For example, critical virtual machines may need to start prior to other systems that are dependent on those virtual machines. Current implementations of HA are unable to control this start order, handle alternate workflows, or handle different scenarios for failure. Current implementations of HA also do not provide geographically distant multisite recovery.

While disaster recovery tools enable complex recovery scenarios while providing site and virtualization management server fault tolerance, current implementations of HA restrict the ability to use disaster recovery tools because HA is dependent upon a single virtualization management server and disaster recovery tools are dependent upon multiple virtualization management servers.

SUMMARY OF THE INVENTION

Exemplary methods, apparatuses, and systems include a first virtual infrastructure management (VIM) server monitoring a first host device to determine if the first host device receives one or more messages within an interval of time from a first storage device indicating a failure of one or more logical disks within the first storage device. The first VIM server manages a first virtual datacenter site including the first host device and the first storage device. A second VIM server manages a second virtual datacenter site including a second host device and a second storage device. The logical disk is replicated on the second storage device. The first VIM server determines that a plurality of virtual machine (VMs) running on the first host device is dependent upon the logical disk(s). The first VIM server automatically performs, in response to the determination that the plurality of VMs is dependent upon the logical disk, a failover of the VMs to the second host device using the replicated logical disk.

In one embodiment, the failover includes determining that the first virtual machine belongs to a first protection group of one or more other virtual machines that are also dependent upon the logical disk. As a result, the virtual machines belonging to the first protection group are failed over to the second virtual datacenter site.

Other features and advantages will be apparent from the accompanying drawings and from the detailed description.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Embodiments described herein include a first virtual infrastructure management (VIM) server monitoring a first host device to determine if the first host device receives a message from a storage device indicating a failure of a logical disk within the storage device. The first VIM server automatically determines, in response to detecting the message, that a plurality of virtual machine (VMs) running on the first host device is dependent upon the logical disk and performs a failover of the plurality of VMs from a first datacenter managed by the first VIM sever to a second datacenter managed by a second VIM server. The recovered VMs are started on a second host device using the second datacenter's replicated copy of the logical disk. As a result, the functionality of high availability that was previously limited to a single datacenter is extended to geographically disjoint datacenters managed by separated VIM servers. In addition to providing site recovery/failure tolerance using either synchronous or asynchronous replication and without special hardware, embodiments described herein provide automated recovery for both an entire site as well as a single device, including the virtualization management server.

Figure 1:
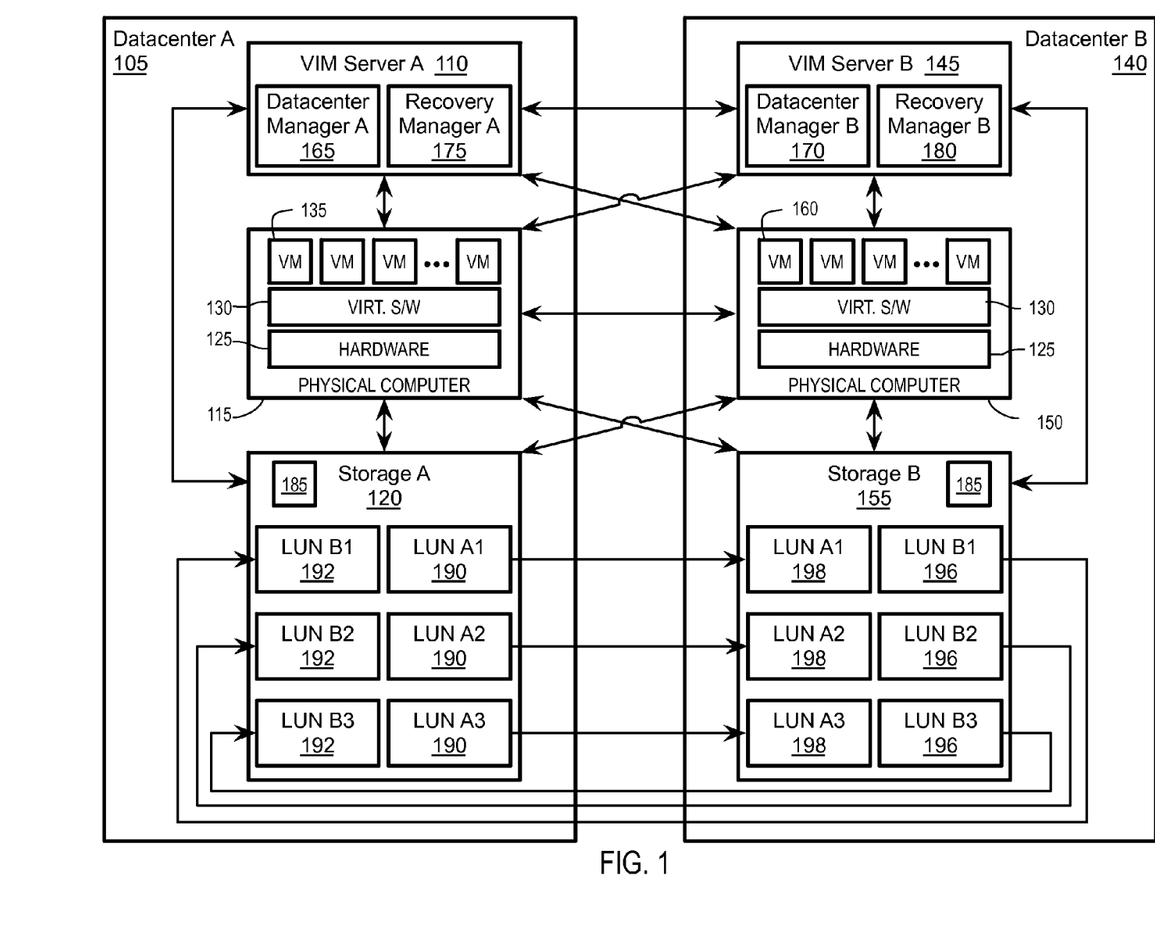
FIG. 1 illustrates, in block diagram form, exemplary virtual datacenters configured to failover a virtual machine in response to the loss of a logical storage device.

FIG. 1 illustrates, in block diagram form, exemplary virtual datacenters configured to failover a VM in response to the loss of a logical storage device. Datacenter A 105 includes VIM server A 110, one or more host devices 115, and storage A 120. Each host device 115 includes hardware 125, virtualization software layer 130 (also referred to as a hypervisor), and VMs 135. Similarly, datacenter B 140 includes VIM server B 145, one or more host devices 150, and storage B 155. Each host device 150 includes hardware 125, virtualization software layer 130, and VMs 160. In one embodiment, datacenter A 105 represents a first datacenter site and datacenter B represents a second, geographically distinct datacenter site.

VMs 135/160 are complete computation environments, containing virtual equivalents of the hardware and system software components of a physical system and are typically implemented by an extensive virtualization infrastructure, which includes a variety of software and hardware components. In one embodiment, one or more of the VMs implement virtual desktops. A virtual desktop is a virtual computing system that operates as a desktop or workstation computer with which an end user can interact using desktop remoting protocol and the software and/or hardware of client device coupled to the corresponding host device over a network. In one embodiment, on or more of the VMs implement a virtualized compute, networking, storage, or security service (e.g., a firewall, webserver, database server, etc.).

Virtualization software layer 130 runs on hardware 125 of host device (e.g., a physical computer) 115 and manages one or more VMs. Virtualization software layer 130 manages physical resources, e.g., hardware 125, as well as maintains virtual-to-physical hardware mappings. For example, virtualization software 130 may manage VM access to a processor, memory, or network interface within hardware 125 as well as a virtual disk for each VM within storage A 120 or storage B 155.

VIM server A 110 includes datacenter manager A 165. In one embodiment, datacenter manager A 165 provides a management console for manual and automated control of hosts 115, VMs 135, and storage A 120. Similarly, datacenter manager B 170 provides a management console for manual and automated control of hosts 150, VMs 160, and storage B 155. For example, datacenter manager A 165 and datacenter manager B 170 provision, configure, and maintain VMs as virtual desktops or network services; manage pools of computer resources (e.g., within storage A 120/storage B 155) to run the VMs; and provide remote administrative access define protection groups, recovery plans, a preferred recovery type, and other failover policies. As used herein, a protection group refers to a set of one or more VMs that use a replicated data store or data store group. For example, when a replicated data store is failed over, that operation affects the VMs in the corresponding protection group. A recovery plan specifies how the virtual machines in a protection group are recovered. For example, a recovery plan may control the steps of the recovery process, including the order in which VMs are powered off or powered on, the network addresses that recovered VMs use, etc.

VIM server A 110 further includes recovery manager A 175 and VIM server B 145 further includes recovery manager B 180. Recovery managers 175/180 each monitor their respective host devices 115/150 for indications of an error with or failure of a logical storage device. Additionally, recovery managers 175/180 manage replication of data between storage A 120 and storage B 155 and implement failover of VMs as described with reference to FIG. 2.

Each of storage A 120 and storage B 155 includes one or more storage devices including non-volatile memory. In one embodiment, storage A 120 and storage B 155 are storage arrays and include storage controllers 185 to serve read and write requests and management commands/queries from host devices 115/150 and VIM servers 110/145. Each of storage A 120 and storage B 155 is partitioned into logical units, volumes, and/or disks (which are used interchangeably herein) that are stored on one or more of the storage devices. For example, storage A 120 is partitioned into six logical units, including three protected logical units 190 identified by logical unit numbers (LUNs) LUN A1, LUN A2, and LUN A3, and three recovery logical units 192 identified by LUN B1, LUN B2, and LUN B3. Similarly, storage B 155 is partitioned into six logical units, including three protected logical units 196 identified by LUN B1, LUN B2, and LUN B3, and three recovery logical units 198, identified by LUN A1, LUN A2, and LUN A3.

Components of datacenter A 105 are coupled to components of datacenter B 140. While various components are illustrated as being directly coupled for the ease of explanation (e.g., to illustrate the direction of replicated data), a network including one or more switches or routers may lie between datacenter A 105 and datacenter B 140 and facilitate the coupling of the various components.

Figure 2:
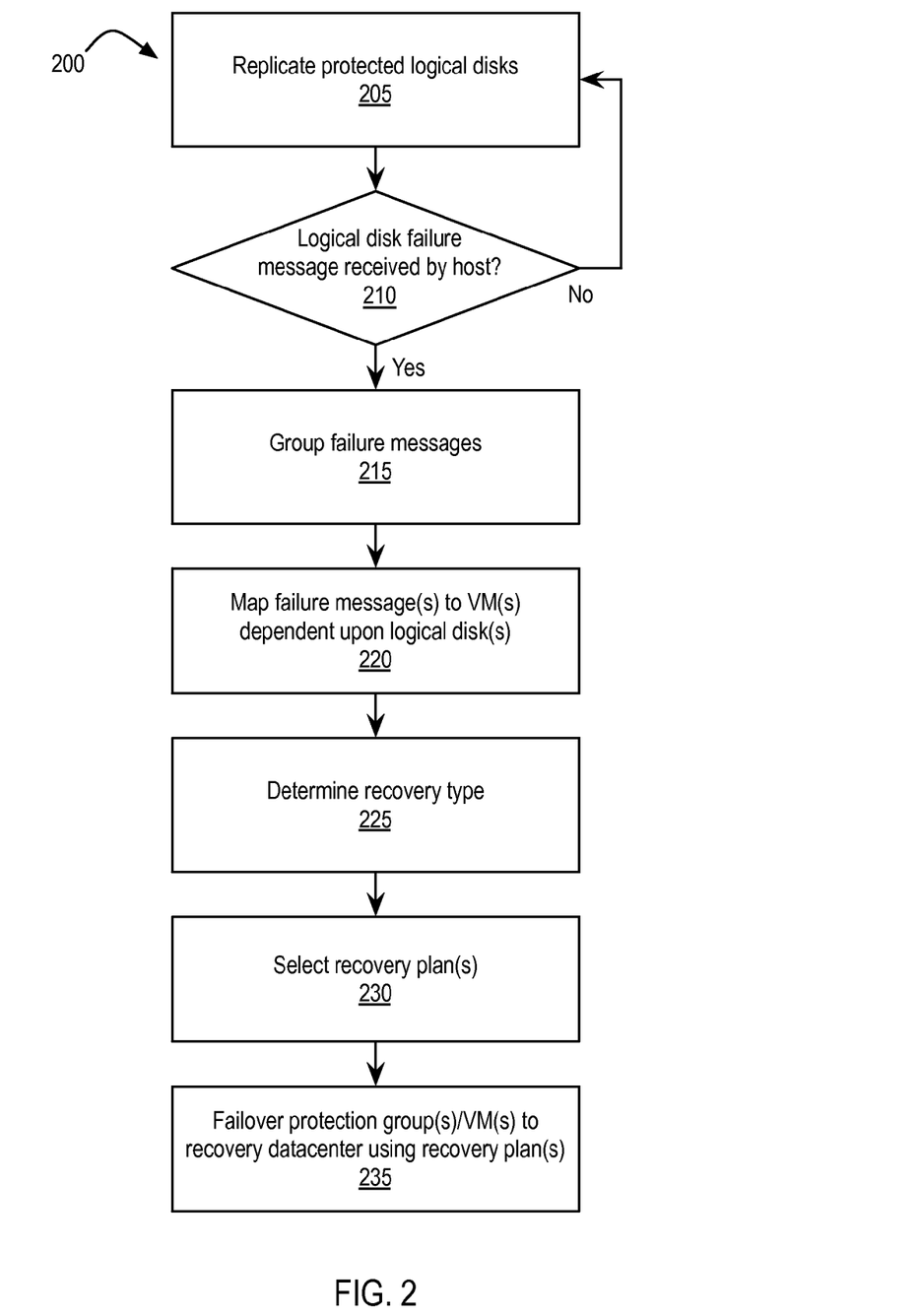
FIG. 2 is a flow chart illustrating an exemplary method of performing the failover of a virtual machine between datacenters in response to the loss of a logical storage device.

FIG. 2 is a flow chart illustrating exemplary method 200 of performing the failover of a VM between datacenters in response to the loss of a logical storage device. At block 205, the storage array in one datacenter replicates data from one or more protected logical units of storage to create and update recovery logical units of storage within another datacenter.

For example, VIM server A 110 configures storage A 120 by designating one or more protected logical units 190 (LUN A1, LUN A2, and LUN A3) to be replicated to datacenter B 140. VIM server B 145, e.g., in coordination with VIM server A 110, configures storage B 155 by designating on one or more recovery logical units 198 (LUN A1, LUN A2, and LUN A3) to receive and store the replicated data. Additionally, VIM server A 110 configures protected logical units 190 as active, e.g., to be available for read and write commands from VMs 135 in host device(s) 115. VIM server B 145 configures recovery logical units 198 as read only for VMs 160 in host device(s) 150 to prevent corruption of the back up data.

Similarly, VIM server B 145 may configure storage B 155 by designating one or more protected logical units 196 (LUN B1, LUN B2, and LUN B3) to be replicated to datacenter A 105 and to be available for read and write commands from VMs 160. VIM server A 110, e.g., in coordination with VIM server B 145, configures storage A 120 by designating on or more recovery logical units 192 (LUN B1, LUN B2, and LUN B3) to receive and store the replicated data and to prevent any write attempts by VMs 135. As a result, datacenters A 105 and B 140 are configured for bidirectional replication of data and each provide for recovery of the other. For the ease of explanation, however, the remainder of method 200 will be described with reference to protection of data from datacenter A 105 to datacenter B 140 and the corresponding failover. The replication of data from datacenter B 140 to datacenter A 105 and corresponding failover may be similarly performed.

In one embodiment, storage A 120 and B 155 replicate data synchronously. For example, when VM 135 writes data to protected LUN A1 190, storage A 120 sends a copy of the data to recovery LUN A1 198 in storage B 155. Upon receiving confirmation from storage B 155 of the write to recovery LUN A1 198, storage A 120 confirms the completion of the write with VM 135. Given the delay in waiting for storage B 155 to confirm the write, a synchronous embodiment is implemented with datacenters within a limited geographic range, e.g., within 100 kilometers or 5 microseconds round-trip time latency.

Alternatively, storage A 120 and B 155 replicate asynchronously. Similar to synchronous replication, when VM 135 writes data to protected LUN A1 190, storage A 120 sends a copy of the data to recovery LUN A1 198 in storage B 155 (individually or batched with other writes). Storage A 120 confirms the completion of the write with VM 135 upon completion of the write to protected LUN A1 190. Storage A 120, however, does not wait to receive confirmation from storage B 155 of the write to recovery LUN A1 198 before confirming the completion of the write with VM 135 and, therefore, does not have the latency/geographic range requirement of synchronous replication. With asynchronous replication, the copy of data stored within recovery LUN A1 198 may represent a back up of data stored within protected LUN A1 190 within a threshold time delay.

In one embodiment, VIM server A 110 configures each VM 135 that is dependent upon a protected logical unit 190 such that VIM server B 145 can add each VM to the inventory at the recovery site, datacenter B 140. For example, each VM is assigned to a resource pool, folder, and network that exist within datacenter B 140. In one embodiment, VIM server B 145 adds placeholder VMs 160 for each protected VM 135. Placeholder VMs 160 are treated like any other VMs of datacenter B 140 inventory, although they are not powered on. When a placeholder VM 160 is created, its folder, network, and compute resource assignments are derived from inventory mappings established at the protected site, datacenter A 105.

At block 210, VIM server A 110 monitors host device 115 to determine if host device 115 receives a message from storage A 120 indicating a failure of a logical disk/unit within storage device A 120. In one embodiment, VIM server A 110 polls host device 115 at an interval for logical disk failures or errors. For example, recovery manager A 175 utilizes an application programming interface (API) within virtualization software 130 to request any received permanent device loss (PDL) events or other logical unit failures. As used herein, a PDL refers to when storage controller 185 is not able to communicate with the logical device/unit and thus cannot serve any read or write requests for an indefinite time period. Alternatively, the monitoring includes host device forwarding the message to or otherwise alerting VIM server 110 of the logical unit failure.

If host device 115 has not received a message from storage A 120 indicating a failure of or error with a logical unit, method 200 returns to block 205 and storage A 120 continues replicating data and VIM server A 110 continues polling host device 115 for logical unit failures. If host device 115 received a message from storage A 120 indicating a failure of a logical disk, at block 215, VIM server A 110 optionally groups failure messages. For example, VIM server A 110 may use an adaptive polling frequency to poll for additional PDL messages and/or buffer logical disk failure messages received within a time period. An exemplary method of grouping failure messages is described herein with reference to FIG. 3. In one embodiment, VIM server A 110 utilizes the adaptive polling and sliding window buffering described in U.S. patent application Ser. No. 13/856,167, which is hereby incorporated by reference in its entirety.

At block 220, VIM server A 110 automatically determines one or more VMs dependent upon the failed logical unit in response to the determination that host device 115 received the message. In an embodiment in which the messages are buffered, VIM server A 110 maps the messages to one or more virtual machines dependent upon the failed logical unit(s). An exemplary method of mapping one or more failure messages to VMs dependent upon the failed logical unit is described herein with reference to FIG. 4.

In one embodiment, VIM server A 110 configures multiple VMs dependent upon a single logical unit or group of logical units to be a part of a protection group. As described herein, when the logical unit(s) that support a protection group failover, the failover operation affects all VMs 135 that use the logical unit(s) in the protection group. As a result, VIM server A 110 maps the failure of a logical unit to all VMs 135 within the preconfigured protection group.

At block 225, VIM server A 110 optionally determines a recovery type. For example, recovery manager A 175 may be configured (by a manual or default setting) to prioritize the failover of a subset of the plurality of VMs 135 to facilitate an expedient recovery of a critical service. The remainder of the plurality VMs 135 may be failed over separately, subsequently, or not at all. For example, a subset of VMs 135 within datacenter A 105 may be assigned to a critical service and failed over first to minimize any interruption to that critical service. Alternatively, the recovery type setting may indicate that a minimum number of VMs 135 to be failed over and VIM server A 110 waits until the minimum number is reached prior to initiating the fail over.

At block 230, VIM server A 110 optionally selects one or more recovery plans. For example, VIM server A 110 may store a mapping between one or more of the protection groups, error types, recovery types, and recovery plans. Based upon the failed logical unit and stored mapping, VIM server A 110 selects a recovery plan. For example, the failure of a logical disk may be addressed by more than one recovery plan. The recovery type or other recovery policy may be used to indicate which recovery plan to choose. The recovery plan specifies ordered steps to be taken in a failover of VMs 135 (e.g., belonging to the protection group mapped to the failed logical unit). For example, protected VMs 135 may be powered down within datacenter A 105 in a particular order and started as VMs 160 within datacenter B 140 in a particular order. In one embodiment, the recovery plan further includes a prioritized order in which multiple protection groups are failed over.

At block 235, VIM server A 110 and VIM server B 145 automatically perform the failover of VM(s) 135 in response to the determination that the VM(s) 135 are dependent upon the failed logical unit. For example, the protected VMs 135 are stopped within datacenter A 105 and storage A 120 replicates any remaining data that can be completed from operational protected logical units 190 (e.g., within the same protection group as the failed protected logical unit 190). VIM server A 110 then stops the replication of the logical units being failed over. VIM server B 145 restarts stopped protected VMs 135 as recovered VMs 160 within datacenter B 140 using recovery logical units 198. VIM server B configures recovery logical units 198 as active, enabling recovered VMs 160 to read from and write to recovery logical units 198. Similarly, VIM server A 110 configures corresponding logical units 190 as inactive/read only.

In an embodiment in which a recovery plan is selected, the failover is performed according to the order specified in the selected recovery plan.

Figure 3:
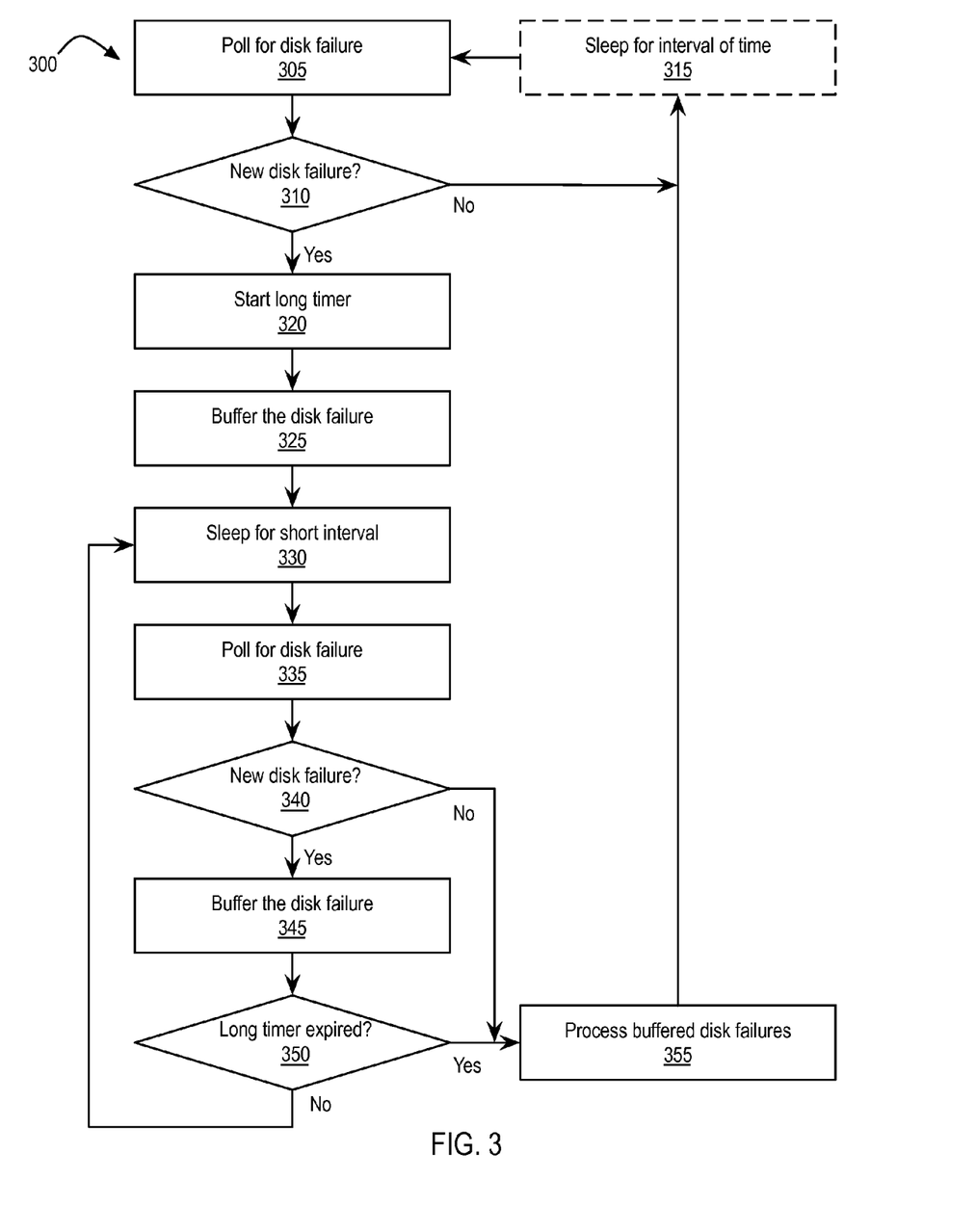
FIG. 3 is a flow chart illustrating an exemplary method of grouping failure messages.

FIG. 3 is a flow chart illustrating exemplary method 300 of grouping failure messages. For example, method 300 may be performed in place of blocks 210 and 215 described above. A single event may trigger multiple failures related to the same data store(s) within a short period of time. As a result, grouping failures provides for a more efficient recovery.

At block 305, VIM server A 110 polls or otherwise monitors host device 115 to determine if host device 115 receives a message from storage A 120 indicating a failure of a logical disk/unit within storage device A 120. At block 310, VIM server A 110 determines if a new failure has occurred. If no new failure has occurred, at block 315, VIM server A 110 optionally causes the polling to sleep for an interval of time. After the sleep interval, or if no sleep interval, VIM server A 110 resumes polling for failures at block 305.

If a failure has occurred, at block 320, VIM server A 110 starts a timer for a long interval as a maximum amount of time to poll for additional disk failures to group with the first failure. At block 325, VIM server A 110 adds the first disk failure to a buffer. At block 330, VIM server A 110 causes the polling to sleep for a short interval of time. For example, the short interval of time is shorter than the long timer.

After the short sleep interval, at block 335, VIM server A 110 polls for an additional failure. At block 340, VIM server A 110 determines if an additional failure has occurred. If an additional failure has occurred, at block 345, VIM server A 110 adds the additional failure to the buffer. At block 350, VIM server A 110 determines if the long timer has expired. If the long timer has not expired, method 300 returns to block 330. If the long timer has expired, or if no additional disk failures occur after the short interval of sleep, at block 355, VIM server A 110 processes the buffered failures (e.g., as described with reference to FIGS. 2 and 4). After processing the failures, method 300 returns to block 305 either directly or, optionally, after sleeping for an interval of time at block 315.

Figure 4:
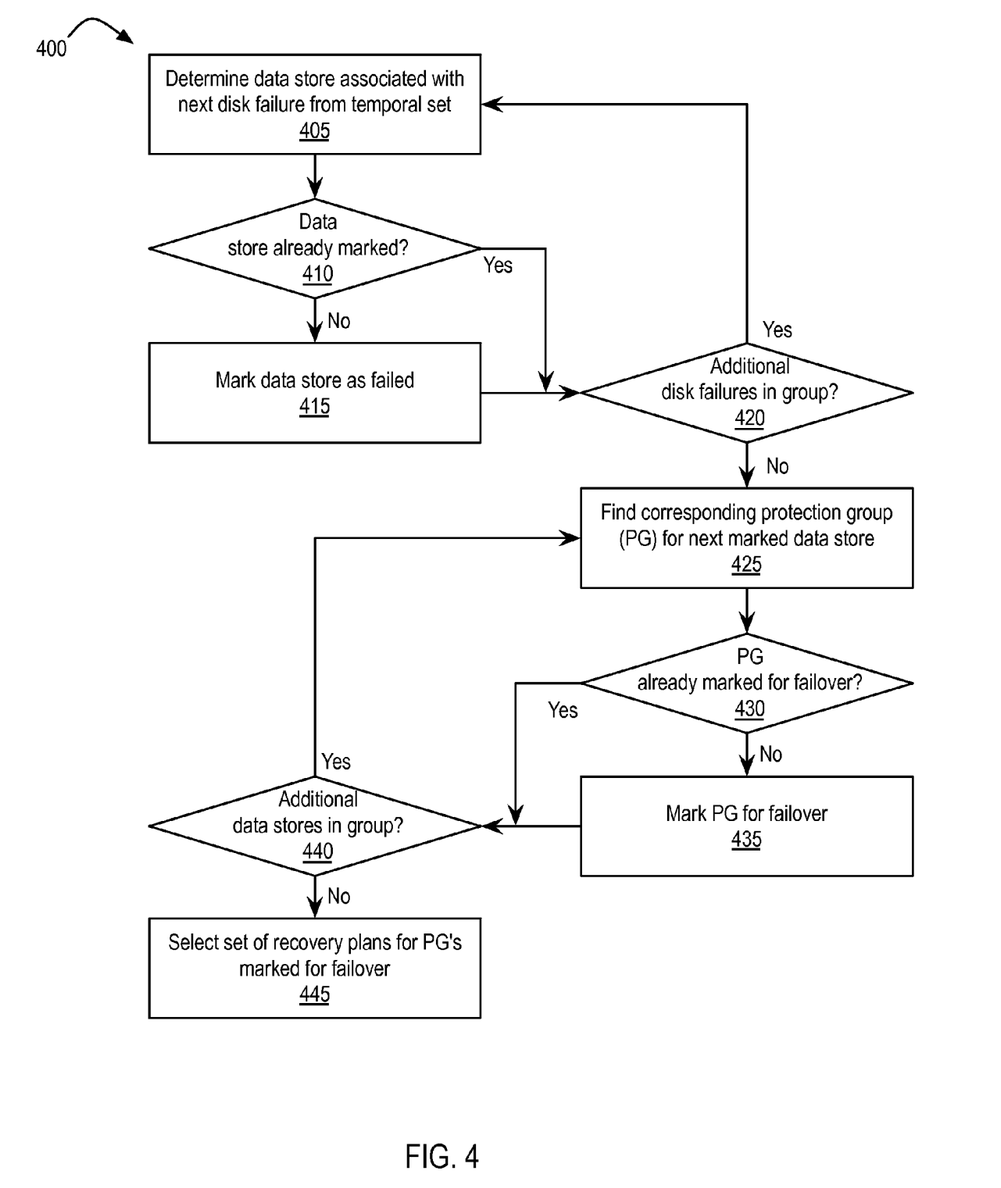
FIG. 4 is a flow chart illustrating an exemplary method of mapping one or more failure messages to virtual machines dependent upon the failed logical unit.

FIG. 4 is a flow chart illustrating exemplary method 400 of mapping one or more failure messages to VMs dependent upon the failed logical unit(s). For example, method 400 may be performed in place of block 220 described above. At block 405, VIM server A 110 determines a data store associated with a first/next disk failure. For example, if a group of disk failures have been buffered as described above, VIM server A 110 processes each to determine the storage device corresponding to the failure. In one embodiment, VIM server A 110 maps logical disks to physical data stores.

At block 410, VIM server A 110 determines if the data store has already been marked for failover. If the data store has not yet been marked, at block 415, VIM server A 110 marks the data store for failover. Once the data store is marked or if the data store was already marked, at block 420, VIM server A 110 determines if any additional failures remain in the group (e.g., in the buffer described above). If there are additional failures to process, method 400 returns to block 405 to process the next disk failure.

If there are no additional failures to process, at block 425, VIM server A 110 determines corresponding VMs (e.g., a protection group) for a first/next marked data store. At block 430, VIM server A 110 determines if the protection group has already been marked for failover. If not, at block 435, VIM server A 110 marks the protection group for failover. If or once the protection group is marked for failover, at block 440, VIM server A 110 determines if additional data stores remain to be processed in the group of marked data stores. If there are additional data stores, method 400 returns to block 425 to process the next data store.

If there are no additional data stores, at block 445, VIM server A 110 selects a set of one or more recovery plans for the marked protection groups and performs the failover according to the recovery type described above.

Figure 5:
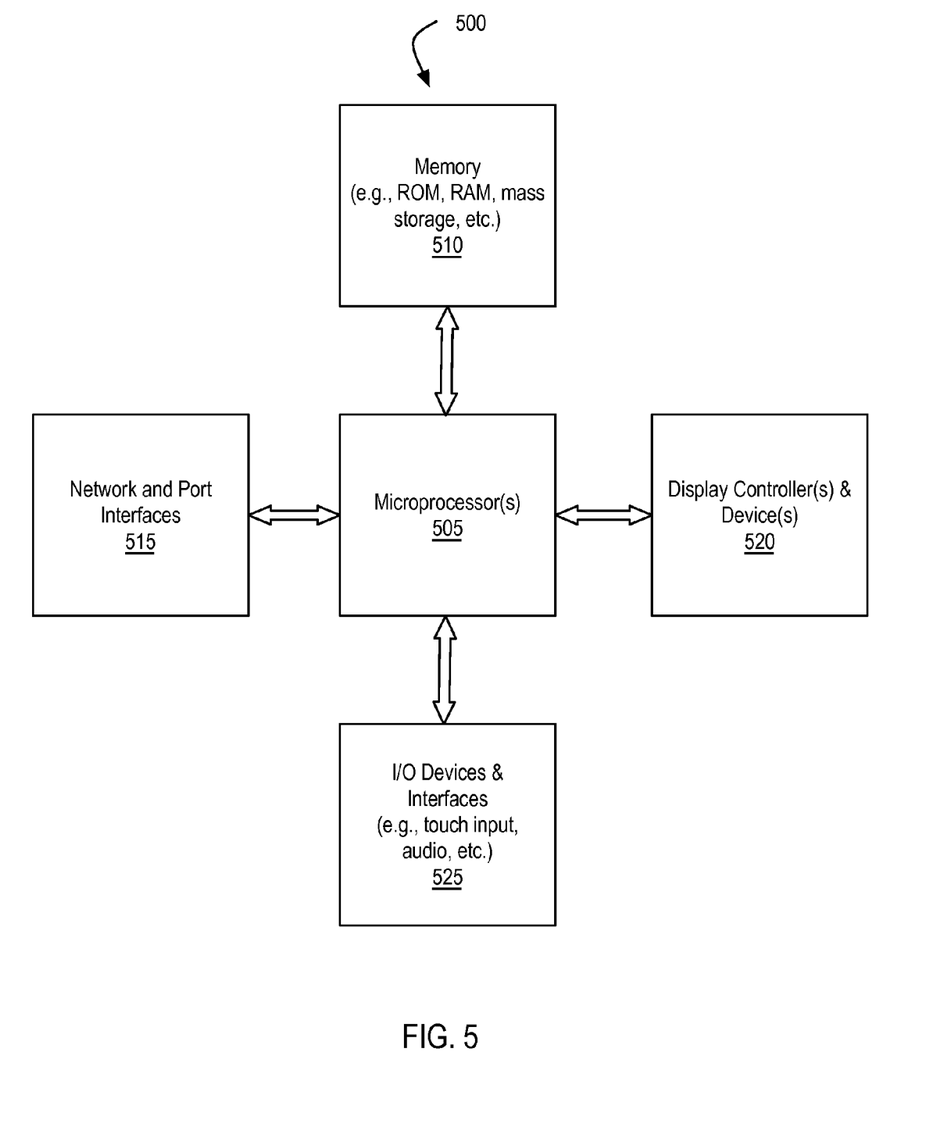
FIG. 5 illustrates, in block diagram form, an exemplary processing system to failover a virtual machine in response to the loss of a logical storage device.

FIG. 5 illustrates, in block diagram form, exemplary processing system 500 failover a virtual machine in response to the loss of a logical storage device. Data processing system 500 includes one or more microprocessors 505 and connected system components (e.g., multiple connected chips). Alternatively, data processing system 500 is a system on a chip.

Data processing system 500 includes memory 510, which is coupled to microprocessor(s) 505. Memory 510 may be used for storing data, metadata, and programs for execution by the microprocessor(s) 505. Memory 510 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 510 may be internal or distributed memory.

Data processing system 500 includes network and port interfaces 515, such as a port, connector for a dock, or a connector for a USB interface, FireWire, Thunderbolt, Ethernet, Fibre Channel, etc. to connect the system 500 with another device, external component, or a network. Exemplary network and port interfaces 515 also include wireless transceivers, such as an IEEE 802.11 transceiver, an infrared transceiver, a Bluetooth transceiver, a wireless cellular telephony transceiver (e.g., 2G, 3G, 4G, etc.), or another wireless protocol to connect data processing system 500 with another device, external component, or a network and receive stored instructions, data, tokens, etc.

Data processing system 500 also includes display controller and display device 520 and one or more input or output ("I/O") devices and interfaces 525. Display controller and display device 520 provides a visual user interface for the user. I/O devices 525 allow a user to provide input to, receive output from, and otherwise transfer data to and from the system. I/O devices 525 may include a mouse, keypad or a keyboard, a touch panel or a multi-touch input panel, camera, optical scanner, audio input/output (e.g., microphone and/or a speaker), other known I/O devices or a combination of such I/O devices.

It will be appreciated that one or more buses, may be used to interconnect the various components shown in FIG. 5.

Data processing system 500 is an exemplary representation of one or more of VIM server A 110, host device(s) 115, storage A 120, VIM server B 145, host device(s) 150, and storage B 155 described above. Data processing system 500 may be a personal computer, tablet-style device, a personal digital assistant (PDA), a cellular telephone with PDA-like functionality, a Wi-Fi based telephone, a handheld computer which includes a cellular telephone, a media player, an entertainment system, or devices which combine aspects or functions of these devices, such as a media player combined with a PDA and a cellular telephone in one device. In other embodiments, data processing system 500 may be a network computer, server, or an embedded processing device within another device or consumer electronic product. As used herein, the terms computer, device, system, processing system, processing device, and "apparatus comprising a processing device" may be used interchangeably with data processing system 500 and include the above-listed exemplary embodiments.

It will be appreciated that additional components, not shown, may also be part of data processing system 500, and, in certain embodiments, fewer components than that shown in FIG. 5 may also be used in data processing system 500. It will be apparent from this description that aspects of the inventions may be embodied, at least in part, in software. That is, the computer-implemented method 200 may be carried out in a computer system or other data processing system 500 in response to its processor or processing system 505 executing sequences of instructions contained in a memory, such as memory 510 or other non-transitory machine-readable storage medium. The software may further be transmitted or received over a network (not shown) via network interface device 515. In various embodiments, hardwired circuitry may be used in combination with the software instructions to implement the present embodiments. Thus, the techniques are not limited to any specific combination of hardware circuitry and software, or to any particular source for the instructions executed by data processing system 500.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. References in the specification to "one embodiment," "an embodiment," "an exemplary embodiment," etc., indicate that the embodiment described may include a particular feature, structure, or characteristic, but not every embodiment may necessarily include the particular feature, structure, or characteristic. Moreover, such phrases are not necessarily referring to the same embodiment. Furthermore, when a particular feature, structure, or characteristic is described in connection with an embodiment, such feature, structure, or characteristic may be implemented in connection with other embodiments whether or not explicitly described. Blocks with dashed borders (e.g., large dashes, small dashes, dot-dash, dots) are used herein to illustrate optional operations that add additional features to embodiments of the invention. However, such notation should not be taken to mean that these are the only options or optional operations, and/or that blocks with solid borders are not optional in certain embodiments of the invention. Numerous specific details are described to provide a thorough understanding of various embodiments of the present invention. However, in certain instances, well-known or conventional details are not described in order to provide a concise discussion of embodiments of the present inventions.

It will be evident that various modifications may be made thereto without departing from the broader spirit and scope of the invention as set forth in the following claims. For example, the methods described herein may be performed with fewer or more features/blocks or the features/blocks may be performed in differing orders. Additionally, the methods described herein may be repeated or performed in parallel with one another or in parallel with different instances of the same or similar methods.

What is claimed is:

1. A computer implemented method, comprising:
    monitoring, by a first virtual infrastructure management (VIM) server, a first host device to determine if the first host device receives a first message from a first storage device indicating a failure of a logical disk within the first set of one or more storage devices, wherein the first VIM server manages a first virtual datacenter site including the first host device and the first set of storage devices, a second VIM server manages a second virtual datacenter site including a second host device and a second set of one or more storage devices, and wherein the logical disk is replicated from a storage device within the first set of storage devices to a storage device within the second set of storage devices;
    monitoring, by the first VIM server in response to the determination that the first host device received the first message, the first host device to determine if the first host device receives, within an interval of time, any additional messages indicating a failure of a logical disk within the first set of storage devices;
    determining, by the first VIM server, that a plurality of virtual machines (VMs) running on the first host device are dependent upon the one or more failed logical disks indicated by the first and additional messages; and
    performing, by the first VIM server automatically in response to the determination that the plurality of VMs are dependent upon the logical disk, a failover of the plurality of VMs to the second host device using the replicated logical disk.

2. The computer-implemented method of claim 1, wherein the determination that the plurality of VMs are dependent upon the logical disk comprises determining that the plurality of VMs belong to a first protection group of one or more other virtual machines that are dependent upon the logical disk, and wherein the first VIM performs a failover of the virtual machines belonging to the first protection group to the second virtual datacenter site.

3. The computer-implemented method of claim 2, wherein the failover further comprises:
    selecting a recovery plan for the protection group, wherein the recovery plan specifies ordered steps to be taken in a failover of the virtual machines belonging to the first protection group, wherein the virtual machines belonging to the first protection group are failed over to the second virtual datacenter site according to the recovery plan.

4. The computer-implemented method of 3, wherein the failover further comprises:
    failing over a second protection group of virtual machines together with the first protection group, wherein the recovery plan further includes a prioritized order in which the first and second protection groups are failed over.

5. The computer-implemented method of claim 1, further comprising:
    selecting, by the first VIM server based upon default or user setting, a subset of the plurality of virtual machines to be included within the failover to facilitate an expedient recovery of a critical service, wherein a remainder of the plurality virtual machines are failed over separately.

6. The computer-implemented method of claim 1, wherein the monitoring includes the first VIM server polling the host device at an adaptive frequency and buffering logical disk failure messages received within a time period, and wherein the failover comprises:
mapping the logical disk failure messages to one or more protection groups, the protection groups including the plurality of VMs; and
performing the failover of the plurality of VMs belonging to one or more of the protection groups to the second virtual datacenter site.

7. The computer-implemented method of claim 1, wherein the message from the first storage device indicates a permanent device loss for the logical disk.

8. A non-transitory computer-readable medium storing instructions, which when executed by a processing device, cause the processing device to perform a method comprising:
monitoring, by a first virtual infrastructure management (VIM) server, a first host device to determine if the first host device receives a first message from a first storage device indicating a failure of a logical disk within the first set of one or more storage devices, wherein the first VIM server manages a first virtual datacenter site including the first host device and the first set of storage devices, a second VIM server manages a second virtual datacenter site including a second host device and a second set of one or more storage devices, and wherein the logical disk is replicated from a storage device within the first set of storage devices to a storage device within the second set of storage devices;
monitoring, by the first VIM server in response to the determination that the first host device received the first message, the first host device to determine if the first host device receives, within an interval of time, any additional messages indicating a failure of a logical disk within the first set of storage devices;
determining, by the first VIM server, that a plurality of virtual machines (VMs) running on the first host device are dependent upon the one or more failed logical disks indicated by the first and additional messages; and
performing, by the first VIM server automatically in response to the determination that the plurality of VMs are dependent upon the logical disk, a failover of the plurality of VMs to the second host device using the replicated logical disk.

9. The non-transitory computer-readable medium of claim 8, wherein the determination that the plurality of VMs are dependent upon the logical disk comprises determining that the plurality of VMs belong to a first protection group of one or more other virtual machines that are dependent upon the logical disk, and wherein the first VIM performs a failover of the virtual machines belonging to the first protection group to the second virtual datacenter site.

10. The non-transitory computer-readable medium of claim 9, wherein the failover further comprises:
selecting a recovery plan for the protection group, wherein the recovery plan specifies ordered steps to be taken in a failover of the virtual machines belonging to the first protection group, wherein the virtual machines belonging to the first protection group are failed over to the second virtual datacenter site according to the recovery plan.

11. The non-transitory computer-readable medium of 10, wherein the failover further comprises:
failing over a second protection group of virtual machines together with the first protection group, wherein the recovery plan further includes a prioritized order in which the first and second protection groups are failed over.

12. The non-transitory computer-readable medium of claim 8, further comprising:
selecting, by the first VIM server based upon default or user setting, a subset of the plurality of virtual machines to be included within the failover to facilitate an expedient recovery of a critical service, wherein a remainder of the plurality virtual machines are failed over separately.

13. The non-transitory computer-readable medium of claim 8, wherein the monitoring includes the first VIM server polling the host device at an adaptive frequency and buffering logical disk failure messages received within a time period, and wherein the failover comprises:
mapping the logical disk failure messages to one or more protection groups, the protection groups including the plurality of VMs; and
performing the failover of the plurality of VMs belonging to one or more of the protection groups to the second virtual datacenter site.

14. The non-transitory computer-readable medium of claim 8, wherein the message from the first storage device indicates a permanent device loss for the logical disk.

15. An apparatus comprising:
a processing device, wherein the processing device executes instructions that cause the apparatus to perform a method comprising:
monitoring, by a first virtual infrastructure management (VIM) server, a first host device to determine if the first host device receives a first message from a first storage device indicating a failure of a logical disk within the first set of one or more storage devices, wherein the first VIM server manages a first virtual datacenter site including the first host device and the first set of storage devices, a second VIM server manages a second virtual datacenter site including a second host device and a second set of one or more storage devices, and wherein the logical disk is replicated from a storage device within the first set of storage devices to a storage device within the second set of storage devices;
monitoring, by the first VIM server in response to the determination that the first host device received the first message, the first host device to determine if the first host device receives, within an interval of time, any additional messages indicating a failure of a logical disk within the first set of storage devices;
determining, by the first VIM server, that a plurality of virtual machines (VMs) running on the first host device are dependent upon the one or more failed logical disks indicated by the first and additional messages; and
performing, by the first VIM server automatically in response to the determination that the plurality of VMs are dependent upon the logical disk, a failover of the plurality of VMs to the second host device using the replicated logical disk.

16. The apparatus of claim 15, wherein the determination that the plurality of VMs are dependent upon the logical disk comprises determining that the plurality of VMs belong to a first protection group of one or more other virtual machines that are dependent upon the logical disk, and wherein the first VIM performs a failover of the virtual machines belonging to the first protection group to the second virtual datacenter site.

17. The apparatus of claim 16, wherein the failover further comprises:
selecting a recovery plan for the protection group, wherein the recovery plan specifies ordered steps to be taken in a failover of the virtual machines belonging to the first protection group, wherein the virtual machines belonging to the first protection group are failed over to the second virtual datacenter site according to the recovery plan.

18. The apparatus of 17, wherein the failover further comprises:
    failing over a second protection group of virtual machines together with the first protection group, wherein the recovery plan further includes a prioritized order in which the first and second protection groups are failed over.

19. The apparatus of claim 15, further comprising:
    selecting, by the first VIM server based upon default or user setting, a subset of the plurality of virtual machines to be included within the failover to facilitate an expedient recovery of a critical service, wherein a remainder of the plurality virtual machines are failed over separately.

20. The apparatus of claim 15, wherein the monitoring includes the first VIM server polling the host device at an adaptive frequency and buffering logical disk failure messages received within a time period, and wherein the failover comprises:
    mapping the logical disk failure messages to one or more protection groups, the protection groups including the plurality of VMs; and
    performing the failover of the plurality of VMs belonging to one or more of the protection groups to the second virtual datacenter site.

* * * * *